(12) United States Patent
Divan et al.

(10) Patent No.: US 11,004,596 B2
(45) Date of Patent: May 11, 2021

(54) HYBRID TRANSFORMER SYSTEMS AND METHODS

(71) Applicant: Georgia Tech Research Corporation, Atlanta, GA (US)

(72) Inventors: Deepakraj M. Divan, Atlanta, GA (US); Rajendra Prasad Kandula, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 16/494,893

(22) PCT Filed: Mar. 16, 2018

(86) PCT No.: PCT/US2018/022972
§ 371 (c)(1),
(2) Date: Sep. 17, 2019

(87) PCT Pub. No.: WO2018/170456
PCT Pub. Date: Sep. 20, 2018

(65) Prior Publication Data
US 2020/0013546 A1    Jan. 9, 2020

Related U.S. Application Data

(60) Provisional application No. 62/473,100, filed on Mar. 17, 2017.

(51) Int. Cl.
*H01F 29/14* (2006.01)
*G05F 1/70* (2006.01)
(Continued)

(52) U.S. Cl.
CPC ............... *H01F 29/14* (2013.01); *G05F 1/70* (2013.01); *H02M 1/32* (2013.01); *H02M 2001/0003* (2013.01); *H02M 2007/4835* (2013.01)

(58) Field of Classification Search
CPC ............ H01F 29/14; G05F 1/70; H02M 1/32; H02M 2001/003; H02M 2007/4835
See application file for complete search history.

(56) References Cited

U.S. PATENT DOCUMENTS 3,600,664 A * 8/1971 Goldberg .................. G05F 1/30
   323/263
4,326,181 A * 4/1982 Allen ................... H01F 27/2823
   174/DIG. 25

(Continued)

OTHER PUBLICATIONS

Search Report and Written Opinion from PCT application No. PCT/US18/022972 dated Jun. 14, 2018 (21 pages).

(Continued)

*Primary Examiner* — Adolf D Berhane
(74) *Attorney, Agent, or Firm* — Troutman Pepper Hamilton Sanders LLP; Ryan A. Schneider

(57) ABSTRACT

Embodiments of the present disclosure can include a hybrid transformer system comprising an electrical voltage transformer comprising: a high-voltage winding, the high-voltage winding comprising a first end and a second end, the first end having a lower voltage than the second end; a plurality of taps disposed proximate the first end of the high-voltage winding; a multi-level converter coupleable to the plurality of taps of the electrical voltage transformer, the multi-level converter configured to simultaneously control voltage injection and VAR injection to the high-voltage winding of the electrical voltage transformer; and a controller electrically coupleable to the multi-level converter, such that when the multi-level converter is coupled to the plurality of taps of the electrical voltage transformer, the controller is configured to selectively inject at least one of VARs or voltage to the high-voltage winding of the electrical voltage transformer.

23 Claims, 6 Drawing Sheets

(51) Int. Cl.
*H02M 1/32* (2007.01)
*H02M 1/00* (2006.01)
*H02M 7/483* (2007.01)

(56) References Cited

U.S. PATENT DOCUMENTS

| | | | |
|---|---|---|---|
| 6,396,248 B1* | 5/2002 | Sen | G05F 1/70 |
| | | | 323/209 |
| 6,417,651 B1* | 7/2002 | Kronberg | G05F 1/14 |
| | | | 323/255 |
| 6,841,976 B1 | 1/2005 | Sen et al. | |
| 2005/0012395 A1 | 1/2005 | Eckroad et al. | |
| 2010/0114398 A1 | 5/2010 | Feng et al. | |
| 2010/0198422 A1 | 8/2010 | Feng | |
| 2010/0201338 A1* | 8/2010 | Haj-Maharsi | H02M 1/4233 |
| | | | 323/305 |
| 2015/0261232 A1 | 9/2015 | Hinz et al. | |
| 2016/0190950 A1 | 6/2016 | Divan et al. | |
| 2017/0054294 A1* | 2/2017 | Lyu | H02M 1/15 |
| 2019/0237971 A1* | 8/2019 | Inam | H02J 3/1807 |

OTHER PUBLICATIONS

Search Report from application No. EP 18768165.5 dated Aug. 12, 2020 (8 pages).

\* cited by examiner

HYBRID TRANSFORMER SYSTEMS AND METHODS

CROSS-REFERENCE TO RELATED APPLICATIONS

This application, filed 16 Mar. 2018, claims the benefit of U.S. Provisional Patent Application No. 62/473,100, filed 17 Mar. 2017, entitled "Novel Implementation of Transformer with Integrated Volt-VAR Control," the entire contents and substance of which are hereby incorporated by reference as if fully set forth below.

BACKGROUND

Recent field measurements have shown increased voltage volatility observed at the edge of the grid. The volatility could be because of the increased load variations over a day. Voltage volatility can worsen with increased residential and commercial solar/photovoltaic penetration. Grid-edge proposals to address voltage volatility include stand-alone voltage or VAR injection. These stand-alone solutions are typically large and bulky, and are expensive, especially for series voltage injection. The effectiveness of each of the above solutions in mitigating voltage volatility depends on factors such as the cause of volatility, type of feeder etc. Field-upgradable transformers (FUTs) have been proposed, where the utility can equip the transformer with either voltage injection or VAR injection capability by adding the appropriate converter, on an as-needed basis directly in the field.

SUMMARY

Embodiments of the present disclosure can include a hybrid transformer system comprising an electrical voltage transformer, a multi-level converter, and a controller. The electrical voltage transformer can comprise a high-voltage winding, the high-voltage winding can comprise a first end and a second end, the first end having a lower voltage than the second end. The electrical voltage transformer can further comprise a plurality of taps that can be disposed proximate the first end of the high-voltage winding. The multi-level converter can be coupleable to the plurality of taps of the electrical voltage transformer and can be configured to simultaneously control voltage injection and VAR injection to the high-voltage winding of the electrical voltage transformer. The controller can be electrically coupleable to the multi-level converter, such that when the multi-level converter is coupled to the plurality of taps of the electrical voltage transformer, the controller can be configured to selectively inject at least one of VARs or voltage to the high-voltage winding of the electrical voltage transformer.

Embodiments of the present disclosure can include a hybrid transformer system for providing simultaneous series voltage injection and shunt VAR injection. The hybrid transformer system can include: a) an electrical voltage transformer can be in electrical communication with a source, the electrical voltage transformer can comprise a high-voltage coil that can have a first end and a second end, the first end can have a lower voltage than the second end and a plurality of taps disposed proximate the first end of the high-voltage coil; b) a multi-level converter that can comprise: a first leg in electrical communication with a first tap of the plurality of taps and a second leg can be in electrical communication with a second tap of the plurality of taps, the first leg for can provide a VAR injection to the first tap, and a third leg in electrical communication with a system neutral and a third tap of the plurality of taps, the third leg can be connected in series with the third tap and system neutral, the third leg can be configured to provide a voltage injection to the high-voltage coil of the electrical voltage transformer; a fail-normal switch can be operably coupled to the first leg of the multi-level converter; and c) a controller can be electrically coupleable to the multi-level converter, such that when the multi-level converter is coupled to the plurality of taps, the controller can be configured to selectively inject at least one of VARs or voltage to the high-voltage coil of the electrical voltage transformer.

Embodiments of the present disclosure can include a method that can comprise: coupling a multi-level converter to an electrical voltage transformer, the electrical voltage transformer can comprise: a) a high-voltage winding, the high-voltage winding can comprise a first end and a second end, the first end can have a lower voltage than the second end; and b) a plurality of taps that can be disposed proximate the first end of the high-voltage winding, wherein the multi-level converter can be coupled to the first end of the high-voltage winding; coupling a controller to the multi-level converter, the controller can be configured to detect at least one of the voltage or VARs of the electrical voltage transformer; and simultaneously adjusting the voltage and VARS of the electrical voltage transformer by selectively injecting at least one of VARs or voltage to the multi-level converter.

In one or more of the above-described embodiments, the electrical voltage transformer can be a single-phase electrical voltage transformer.

In one or more of the above-described embodiments, the plurality of taps can comprise an up-voltage tap, a down-voltage tap, and a nominal tap, and the multi-level converter can be coupleable to each of the up-voltage tap, the down-voltage tap, and the nominal tap. Further, in one or more of the above-described embodiments, the multi-level converter can comprise a first leg that can be electrically coupleable to the up-voltage tap, a second leg that can be electrically coupleable to the down-voltage tap, the second leg can be in shunt with the first leg, and a third leg can be electrically coupleable to the down-voltage tap, the third leg can be in series with the nominal tap and a system neutral.

In one or more of the above-described embodiments, the multi-level converter can be a two-level power converter. In one or more of the above-described embodiments, the multi-level converter can be a three-level power converter. In one or more of the above-described embodiments, the multi-level converter can be a neutral-point clamped converter.

In one or more of the above-described embodiments, the multi-level converter can comprise a fail-normal switch. In one or more of the above-described embodiments, the fail-normal switch can comprise a bi-directional silicon-controlled rectifier and a mechanical switch.

In one or more of the above-described embodiments, a VAR injection range of the controller can be dependent on the voltage injection of the converter.

In one or more of the above-described embodiments, the controller can be external from the transformer system.

In one or more of the above-described embodiments, the transformer system is not cooled using transformer oil.

DETAILED DESCRIPTION

Figure 1A:
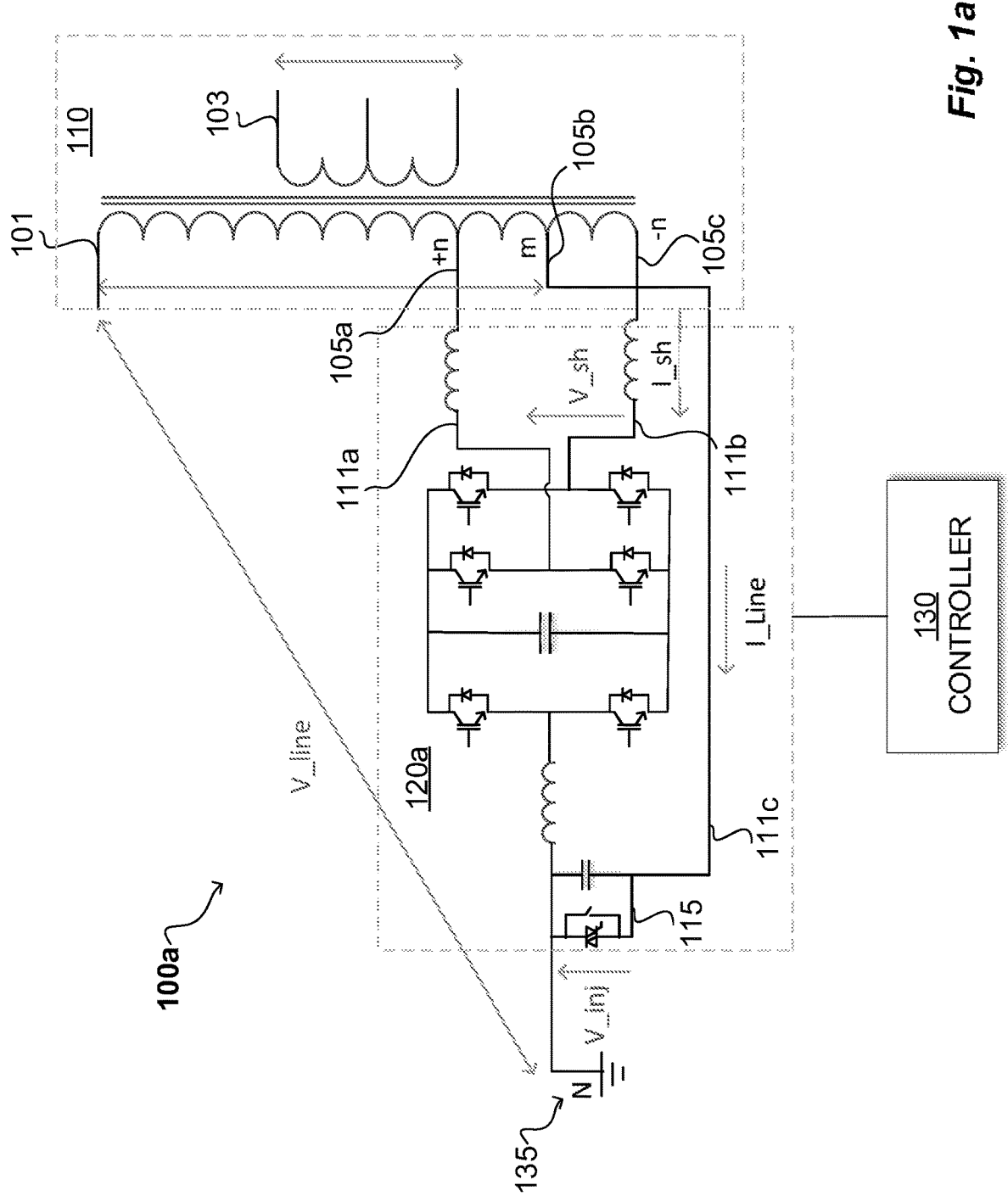
FIGS. 1a and 1b show topology of hybrid transformer systems realizing simultaneous series voltage and shunt VAR injection using a two-level converter and a three-level converter respectively, in accordance with one or more exemplary embodiments of the present disclosure.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Embodiments of the present disclosure include hybrid transformer systems for providing simultaneous control of voltage on the transformer output, as well as VARs injected into the AC line of an electrical voltage transformer. The presently disclosed embodiments can be advantageous because the disclosed embodiments can realize simultaneous voltage injection and VAR injection with independent control of both quantities while implementing a converter on the high-voltage winding of an electrical voltage transformer. Previously, this was not thought possible given that implementation on the high-voltage winding presented challenges in handling basic insulation levels (BIL) and fault currents. Embodiments of the present disclosure avoid such challenges by connecting a multi-level converter to the neutral end of the high-voltage winding and by implementing a switch, e.g., a fail-normal switch. Previously-described methods for addressing this issue could only provide series voltage injection alone, not series voltage injection and VAR injection. These previously-disclosed methods required significant transformer manipulation (e.g. implementation of oil-based cooling) to account for large loss. Because the presently disclosed embodiments realize low loss, they do not require complex manipulation and therefore, can have reduced size and complexity. The presently disclosed embodiments are also advantageous because the disclosed embodiments can realize low cost and high efficiency in response to voltage volatility at grid edge, meet basic insulation levels (BIL) and fault current requirements, and source fault currents needed to coordinate with downstream switchgear and protection devices.

"Electrical voltage transformers" can refer to transformers that provide the final voltage transformation in an electric power distribution system and act as a hub for an electric power system by connecting a utility's customers to the grid. Electrical voltage transformers can step down the voltage from a distribution medium voltage level (typically 4-24 kV), to a lower voltage (120 to 480 volts), for use at customer homes and industrial/commercial facilities. Nevertheless, electrical voltage transformers do not include any monitoring modules and lack control capabilities. As a person of ordinary skill in the art would know, an electrical voltage transformer has at least two windings at different voltages, wherein one of those windings is at a higher voltage than the other. As defined herein, a high-voltage winding has a voltage greater than another winding of the transformer. For example, in an embodiment with two windings, the winding having a higher voltage is the high-voltage winding and the winding at a relatively lower voltage as compared to the high-voltage winding is the low-voltage winding.

Voltage regulations on the secondary side (or low-voltage side) of electrical voltage transformers can be achieved by installations of tap changing transformers and continuously variable line voltage regulators. However, mechanical switches cannot provide fast responses and the operations for electromechanical switching schemes can be limited. Inverters- or direct AC/AC converters-based solutions may also regulate voltage on the secondary side of the electrical voltage transformers. Nevertheless, the power losses are high, and these solutions usually require fans or other active thermal management schemes that limit the overall life of the device. The power losses also detract from the reductions in power consumption that are gained by the customer. The basic mismatch between the low cost and long life of an electrical voltage transformer, and the high cost and short life for controls and communications needed to deliver the improved value to the utility's customers remains a big challenge.

Figure 1B:
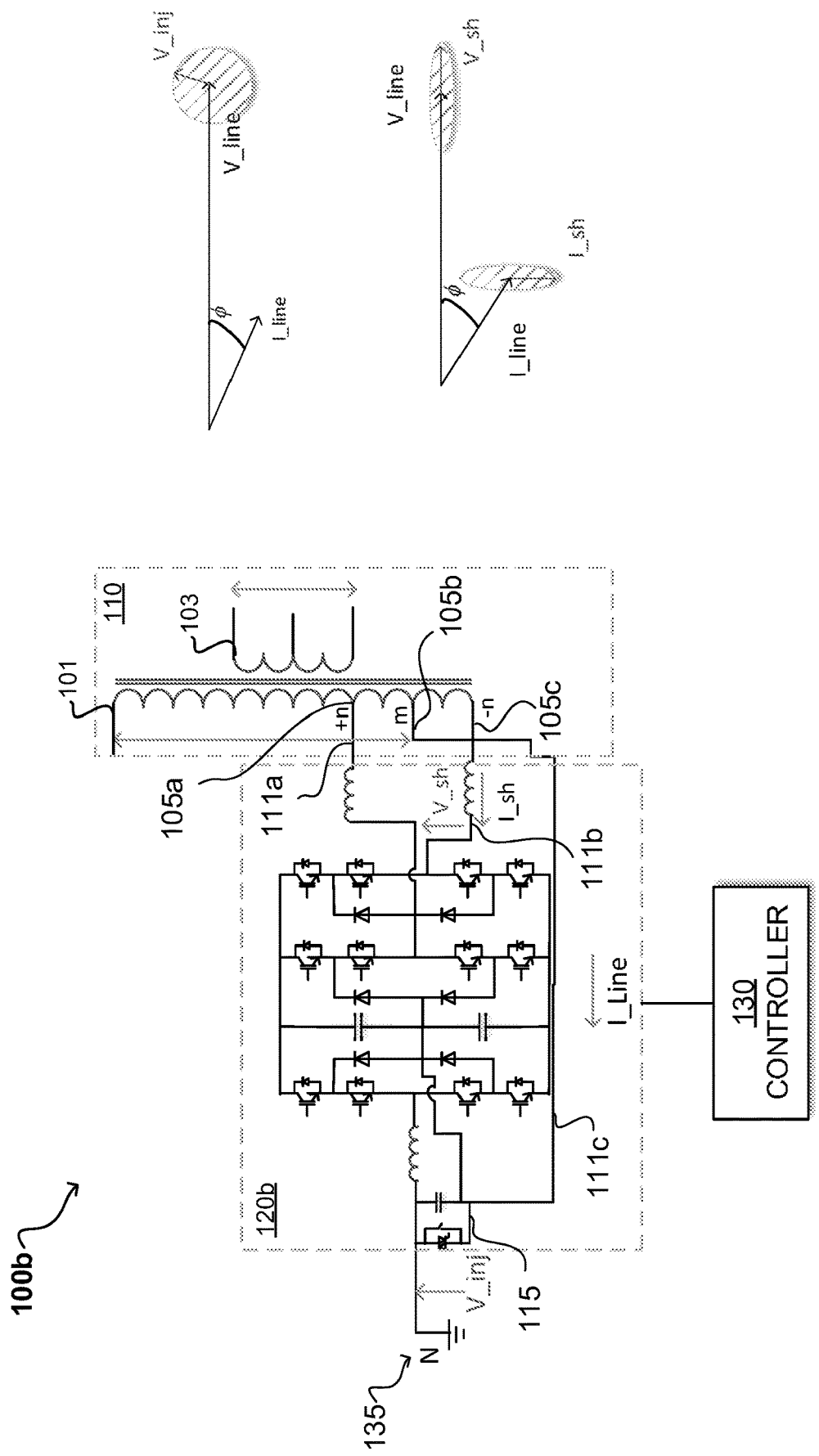

FIG. 1a illustrates the topology of a hybrid transformer system using a two-level converter, in accordance with an exemplary embodiment of the present disclosure. FIG. 1b illustrates a similar topology to FIG. 1a but incorporates a three-level converter, in accordance with an exemplary embodiment of the present disclosure. Hybrid transformer systems 100a, 100b can include an electrical voltage transformer 110 comprising high voltage windings 101 and low voltage windings 103. The high-voltage windings 101 can be in electrical communication with a source (not pictured), the source for providing a current to the electrical voltage transformer 110 at the high-voltage windings 101. The high-voltage windings 101 can further comprise a plurality of taps for coupling with one or more devices. For instance, as illustrated at FIG. 1a, the hybrid transformer systems 100a, 100b can comprise a multi-level converter 120a, 120b coupled to a set of taps biased with respect to the ground (e.g. system neutral) 130. In other words, the multi-level converter 120a, 120b can be biased to a low-voltage end of the multi-level converter 120a, 120b. As described in more detail below, the converter can generate two voltages, one between the third leg 111c and system neutral 135 for controlling series voltage compensation and a voltage between the first leg 111a and second leg 111b which can control shunt VARs and loss compensation.

In some embodiments, the set of taps can comprise an up-voltage tap (+n) 105a, a nominal tap (m) 105b, and a down-voltage tap (−n) 105c. As such, the up-voltage tap 105a can be for increasing the voltage, the down-voltage tap 105c can be for decreasing the voltage, and the nominal tap 105b can be for maintaining the voltage. The multi-level converter can comprise a plurality of legs in electrical communication with the set of taps, inductors, capacitors, transistors (e.g. insulated-gate bipolar transistors (IGBT)), sensors (e.g. voltage sensors and current sensors), DSP/FPGA-based controllers, and switches. Persons ordinarily skilled in the art would understand that when the hybrid transformer system is coupled to a controller the voltage and VARs of the system can be controlled based on voltage or current readings from the sensors.

Figure 1C:
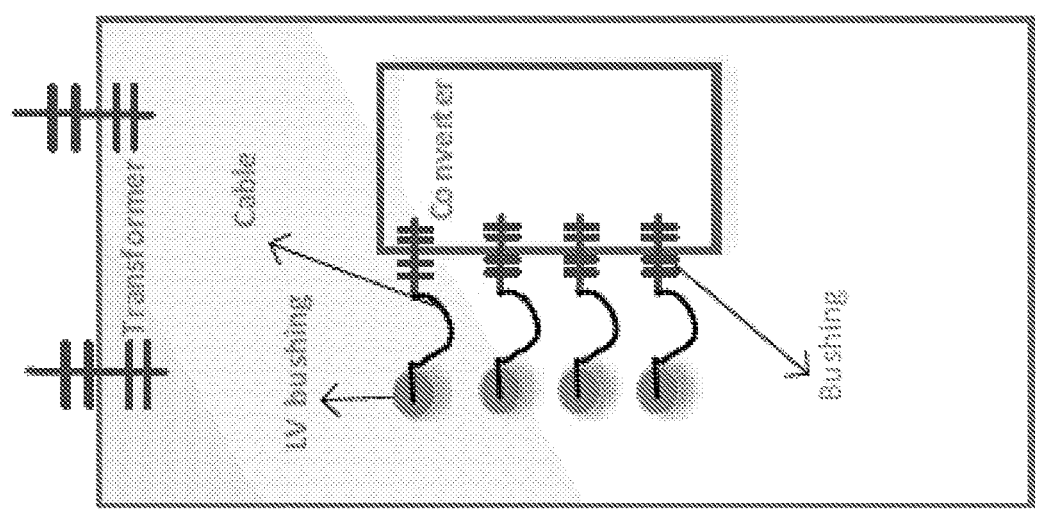
FIG. 1c is a schematic showing an exemplary coupling of the converter to the electric voltage transformer, in accordance with one or more exemplary embodiments.

"Coupleable" as used herein means that a device can be added or retrofitted to an existing transformer without alteration to the existing transformer. For example, the device can be attachably, detachably, or removably coupled to the plurality of taps of an existing transformer by various coupling means. In some embodiments, the converter can be coupled to the plurality of taps using a box coupled with the plurality of taps as illustrated in FIG. 1c. As illustrated in FIG. 1c, the converter and controller of the hybrid transformer system can be physically mounted within an enclosure with bushings as shown in FIG. 1c. The bushings on the enclosure can be connected to the transformer bushings through a cable. The enclosure can be mounted on the transformer tank through either magnetic attachment or through mechanical connection or alternatively can be installed on the distribution pole. Further, the device can be installed in the field and can be retrofitted to produce a hybrid transformer system. In an embodiment, an existing transformer is retrofitted to produce a hybrid transformer system. In some embodiments, the multi-level converter can be coupled to the converter 120a, 120b by connecting the legs 111a, 111b, 111c of the multi-level converter 120 to the electrical voltage transformer 110.

In some embodiments, the multi-level converter 120a, 120b can include a first leg 111a and a second leg 111b of the multi-level converter 120a, 120b connected in parallel. The first and second legs 111a, 111b of the multi-level converter 120a, 120b can act as a shunt. The first leg 111a can be coupled to and in electrical communication with the up-voltage tap (+n) 105a of the electrical voltage transformer 110. The second leg 111b can be coupled to and in electrical communication with the second tap 105c. The first and second legs 111a, 111b can be characterized by a shunt voltage, as illustrated in FIGS. 1a and 1b. When in communication with controller 130, the multi-level converter 120a, 120b can be configured to control VAR injection to the electrical voltage transformer 110 via the first and second legs 111a, 111b.

In some embodiments, the multi-level converter can include a third leg 111c connected in series between a third tap 105b and the system neutral 135. The third leg 111c can comprise a fail-normal switch 115. When in communication with controller 130, the multi-level converter 120 can be configured to control a voltage injection to the electrical voltage transformer 110 via the third leg 111c.

Further, the nominal tap 105c of the set of taps of the high-voltage winding 101 can be grounded via the fail-normal switch 115. In some embodiments, the fail normal switch 115 can be semiconductor-based AC switches. In some embodiments, each of the AC switches can be a pair of insulated-gate bipolar transistors (IGBTs) that are either common-emitter and/or common-collector connected. Further, the fail-normal switch can include mechanical or electromechanical switches. In some embodiments, the fail-normal switch can comprise a thyristor and a mechanical switch. In some embodiments, the fail-normal switch can include a bi-directional silicon-controlled rectifier (SCR) and a mechanical switch. In some embodiments, the fail-normal switch can ensure the path for line current during all conditions including converter failure. For instance, the fail-normal switch can switch to bypass the converter when the converter fails or there is a fault downstream.

In some embodiments, the electrical voltage transformer 110 can be a single-phase electrical voltage transformer, as illustrated at FIGS. 1a and 1b.

In some embodiments, as shown in FIG. 1a, the multi-level power converter 120a, 120b can be a two-level converter. For instance, a two-level converter is a three-phase converter that can synthesize two node voltages at a phase terminal and use pulse-width modulation (PWM) at a fixed switching frequency to approximate a desired continuous waveform. In other embodiments, as shown in FIG. 1b, the multi-level power converter 120a, 120b can be a three-level power converter. Three-level power converters are three-phase converters that can synthesize three (as opposed to two) discrete voltage levels at the AC terminal of each phase (+, 0, −) and provide improved harmonic performance, double voltage-rating, and keeps losses low. In some embodiments, the multi-level power converter can be a neutral-point clamped converter. A neutral-point clamped converter can synthesize three node voltages at the phase output. This converter can use carrier-based PWM signals with a fixed switching frequency to turn on and off the transistors in each converter phase leg. In some embodiments, these two-level and three-level converters can further incorporate semiconductor-based devices, such as insulated-gate bipolar transistor (IGBT) valves allowing for increased controllability and improved harmonic performance.

Figure 2:
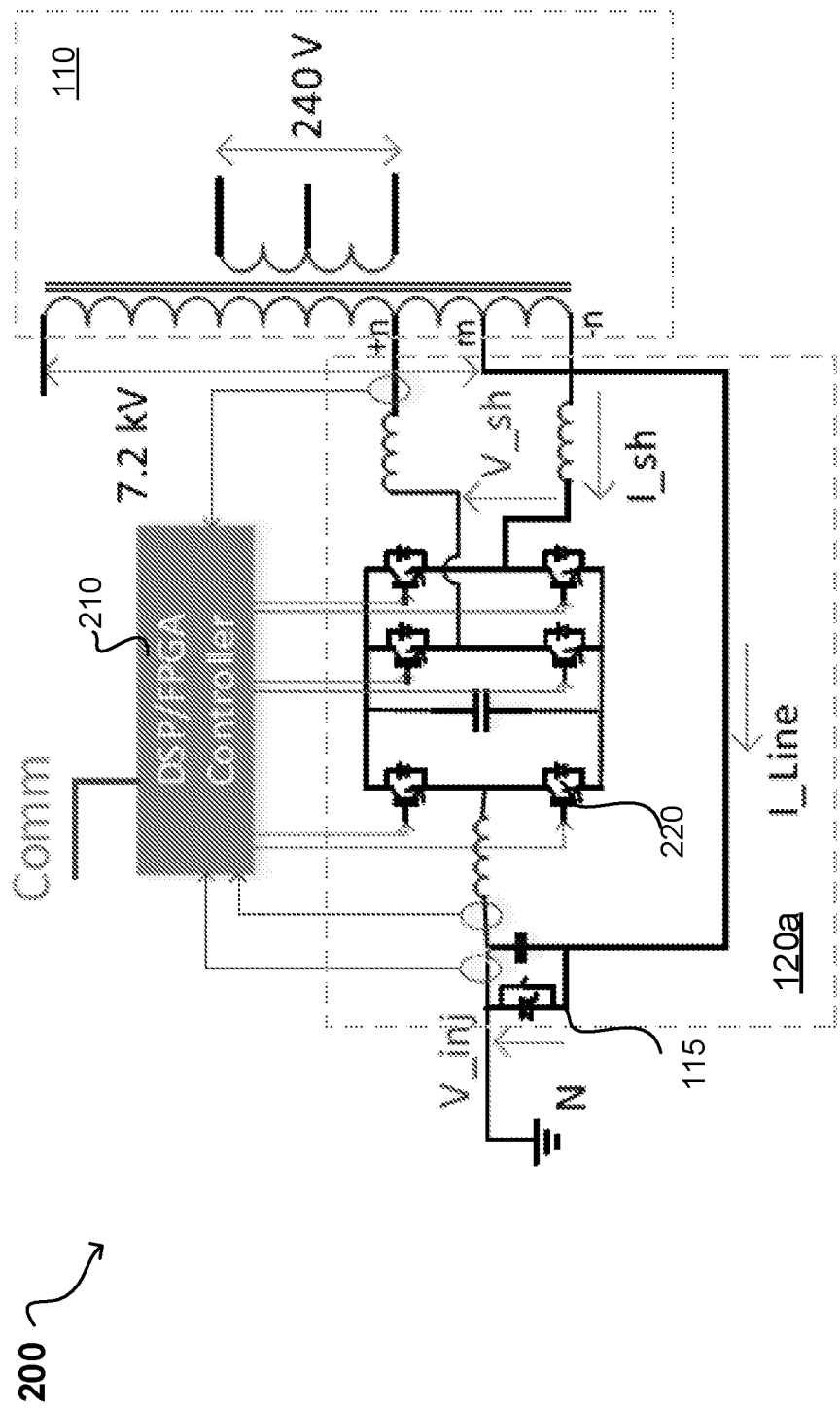
FIG. 2 is an exemplary controller, in accordance with one or more exemplary embodiments of the present disclosure.

The hybrid transformer system can further comprise a controller 130 for controlling one or more of voltage injection or VAR injection depending on the voltage and VARs of the electrical voltage transformer 110. The controller 130 can include any controller device known in the art. For instance, as illustrated at FIG. 2, the controller can be a DSP/FPGA controller 210 which is electrically coupleable to the transformer at various points. As illustrated at FIG. 2, the controller 210 can be in electrical communication with one or more portions of the multi-level converter 120a and receive various voltage and current readings. This may be facilitated through the use of voltage or current sensors integrated on the converter 120a. The controller can further be in electrical communication with the switching devices (e.g. IGBTs) 220 of the converter 120*a* through which the controller can simultaneously control both voltage and VAR injection to the electrical voltage transformer 110 via the various legs of the multi-level converter as discussed previously. This can be achieved by using the sensor data to execute a control algorithm and generate switching signals to the switching devices 220 and the fail normal switch 115. In some embodiments, the controller can include a communication channel to receive set points from a central control center as desired.

In some embodiments, the charge range of the shunt controller can depend on the voltage injection of the series controller. In some embodiments, the controller can implement the following control algorithm to generate switching signals to the switching devices 220. With the converter connected across transformer taps +n and −n, the series voltage injection range can be given by the following equation:

$$V_{inj} = \pm n * V_{line}$$

The shunt VAR injection $Q_{shunt}$ range can be given by the following equation:

$$Q_{shunt} = \pm \left( 2n * V_{line} * \sqrt{I_{shunt}^2 - \left( \frac{V_{inj} * I_{line} * \cos\varphi}{2n * V_{line}} \right)^2} \right)$$

Where $I_{shunt}$ is the shunt current observed at the second leg, $V_{line}$ is the voltage of the line between the input point and the system neutral, $I_{line}$ is the current at the input point. To provide the shunt VAR control capability the current rating of the transformer tap winding can be increased by a factor defined as:

$$I_{tap} = \sqrt{I_{line}^2 + I_{shunt}^2}$$

The electrical voltage transformer can be controlled as desired. For instance, in some embodiments, the electrical voltage transformer can operate normally without voltage or VAR injection even when coupled to the converter.

Typical solutions to voltage volatility increase the loss of the transformer system by at least 1%. An advantage of the present disclosure is that the hybrid transformer system can have decreased percent loss as compared to typical solutions. Embodiments of the present disclosure can increase the loss of the system by less than about 1%, less than about 0.9%, less than about 0.8%, less than about 0.75%, less than about 0.7%, less than about 0.6%, less than about 0.5%, less than about 0.4%, less than about 0.3%, less than about 0.25%, less than about 0.2%, less than about 0.15%, less than about 0.1%, less than about 0.05%, less than about 0.03%, or less than about 0.01%. embodiments of the present disclosure can increase the loss of the system by no more than about 0.0001%, by no more than about 0.01%, by no more than about 0.03%, by no more than about 0.05%, by no more than about 0.1%, by no more than about 0.15%, by no more than about 0.2%, by no more than about 0.25%, by no more than about 0.3%, by no more than about 0.4%, by no more than about 0.5%, or by no more than about 0.99%. Embodiments of the present disclosure can increase the loss of the system by about 0.0001%, about 0.01%, about 0.05%, about 0.1%, about 0.2%, about 0.25%, about 0.27%, about 0.3%, about 0.35%, about 0.4%, about 0.5%, or about 0.75%. Embodiments of the present disclosure can increase the loss of the system by 0.0001%, 0.01%, 0.05%, 0.1%, 0.2%, 0.25%, 0.27%, 0.3%, 0.35%, 0.4%, 0.5%, or 0.75%. Embodiments of the present disclosure can increase the loss of the system from about 0.0001% to about 0.3%. Embodiments of the present disclosure can increase the loss of the system from 0.0001% to 0.3%.

A further advantage of the present disclosure is decreased complexity. This can be due in part to there not being a need for instrumentation added to the transformer system to provide cooling. As such one or both of the transformer or converter can operate without the need for oil-based cooling or fan-based cooling. In other words, due to the decrease in the percent loss as compared to other systems, embodiments of the present disclosure can be air-cooled without the need for additional bulky equipment.

Example

Figure 3:
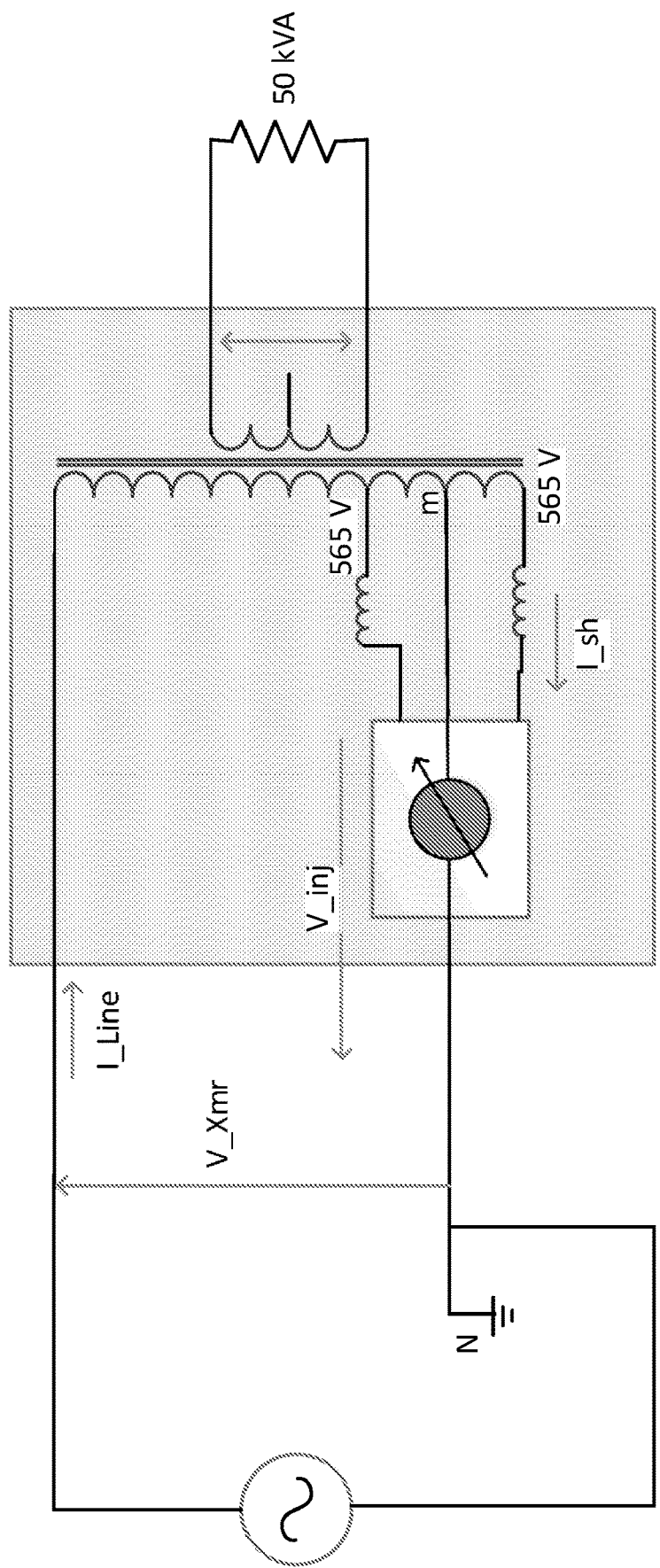
FIG. 3 shows a schematic of a system used to verify the hybrid transformer systems, in accordance with one or more exemplary embodiments of the present disclosure.

FIG. 3 shows an exemplary system used to verify the transformer systems described above. The system includes a 7.2 kV/240 V 50 kVA transformer fed from a 7.2 kV source and connected to the 50 kW load on 240 V winding. The transformer has taps at +/−565 V and the converter is interfaced across the taps.

Figure 4:
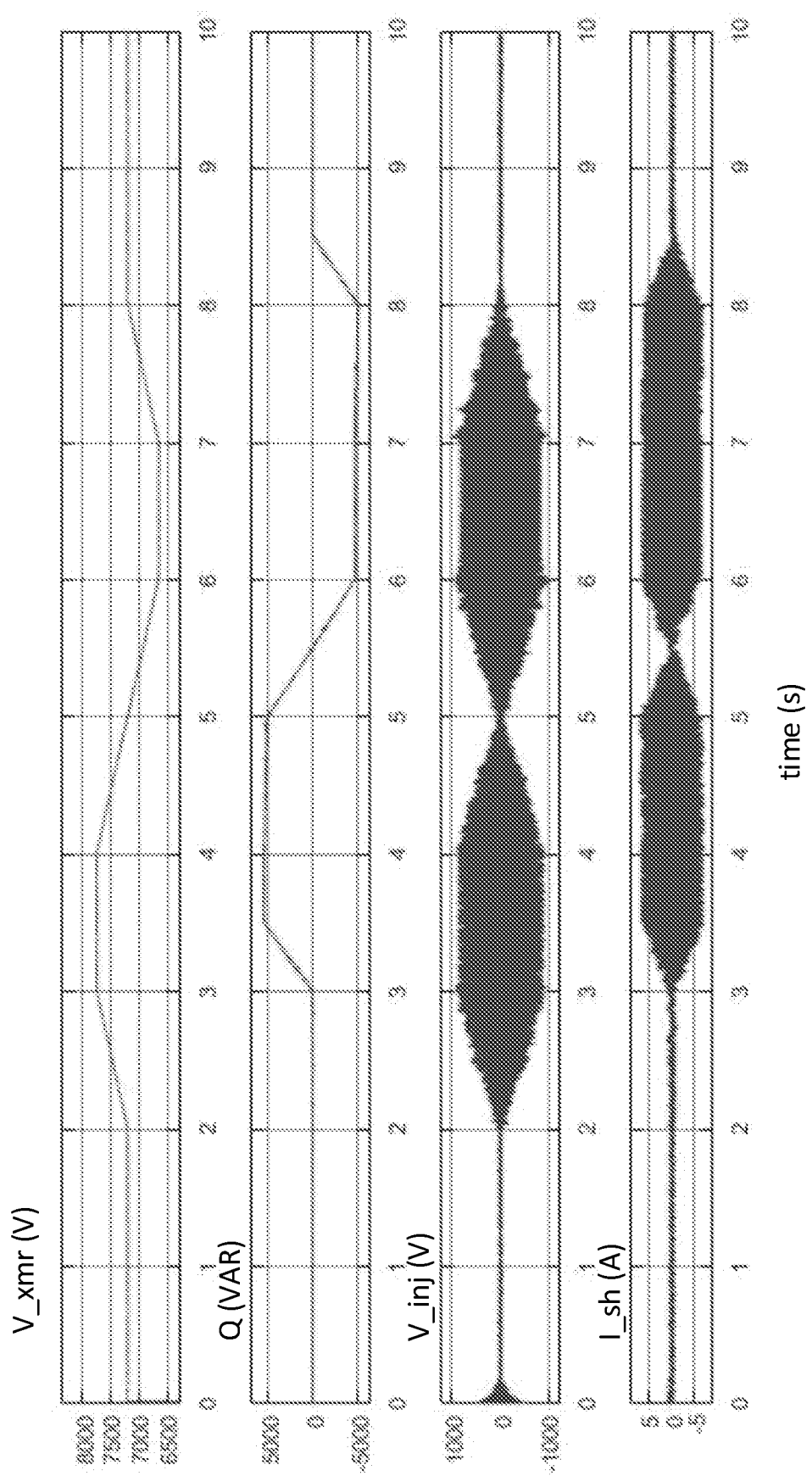
FIG. 4 show graphical representations of simultaneous control of voltage and VAR injection, in accordance with one or more exemplary embodiments of the present disclosure.

FIG. 4 shows a graphical representation of the simulation results showing simultaneous control of voltage and VAR injection. Initially, the converter injects 0V and also maintains 0 VAR injection. At t=2 s, the voltage injected in series is slowly ramped up to 565 V, resulting in transformer voltage V_xmr that is increased by 5%. Starting at t=3 s, the VAR injection Q is ramped up to 5 kVAR by controlling the shunt current I_sh. Starting at 4s the series voltage injection is reversed to reduce the transformer voltage to 95%. As the series voltage is ramped down, starting at t=5 s, the converter is controlled to vary shunt VARS to −5 mVAR, showing the simultaneous control of series voltage and shunt VAR control.

We claim:

1. A hybrid transformer system comprising:
an electrical voltage transformer comprising:
a high-voltage winding comprising a first end and a second end, the first end having a lower voltage than the second end; and
taps disposed proximate the first end of the high-voltage winding;
a multi-level converter coupleable to at least a portion of the taps and configured to independently and simultaneously control series voltage injection and shunt VAR injection to the high-voltage winding; and
a controller electrically coupleable to the multi-level converter, such that when the multi-level converter is coupled to at least a portion of the taps of the electrical voltage transformer, the controller is configured to selectively inject at least one of shunt VARs and series voltage to the high-voltage winding of the electrical voltage transformer.

2. The transformer system of claim 1, wherein one or more of the taps are selected from the group consisting of an up-voltage tap, a down-voltage tap, a nominal tap, and combinations thereof; and
wherein the multi-level converter is coupleable to each of the taps.

3. The transformer system of claim 1, wherein the multi-level converter is selected from the group consisting of a two-level power converter, a three-level power converter, and a neutral-point clamped converter.

4. The transformer system of claim 1, wherein the multi-level converter comprises a fail-normal switch.

5. The transformer system of claim 4, wherein the fail-normal switch comprises:
a bi-directional silicon-controlled rectifier; and
a mechanical switch.

6. The transformer system of claim 1, wherein the transformer system is not cooled using transformer oil.

7. The transformer system of claim 1, wherein a shunt VAR injection range of the controller is dependent on the series voltage injection of the multi-level converter.

8. The transformer system of claim 1, wherein the controller is external from the other elements of the transformer system.

9. A transformer system comprising:
an electrical voltage transformer comprising:
a high-voltage winding comprising a first end and a second end, the first end having a lower voltage than the second end; and
taps extending from locations in the first end of the high-voltage winding; and
a multi-level converter coupleable to at least a portion of the taps and configured to independently and simultaneously control series voltage injection and shunt VAR injection to the high-voltage winding;
wherein the taps comprise an up-voltage tap, a down-voltage tap, and a nominal tap;
wherein the multi-level converter comprises:
a first leg electrically coupleable to the up-voltage tap;
a second leg electrically coupleable to the down-voltage tap, the second leg in shunt with the first leg; and
a third leg in series with the nominal tap and a system neutral;
wherein the first and second legs of the multi-level converter are configured to inject voltage in shunt with the up-voltage tap and the down-voltage tap to provide the injected shunt VARs; and
wherein the third leg of the multi-level converter is configured to inject voltage between the nominal tap and the system neutral to provide the injected series voltage.

10. The transformer system of claim 9 further comprising a controller electrically coupleable to the multi-level converter, such that when the multi-level converter is coupled to at least a portion of the taps of the electrical voltage transformer, the controller is configured to selectively inject at least one of shunt VARs and series voltage to the high-voltage winding of the electrical voltage transformer.

11. The transformer system of claim 10, wherein a shunt VAR injection range of the controller is dependent on the series voltage injection of the multi-level converter.

12. The transformer system of claim 10, wherein the controller is external from the other elements of the transformer system.

13. The transformer system of claim 9, wherein the transformer system is not cooled using transformer oil.

14. A hybrid transformer system for providing simultaneous series voltage injection and shunt VAR injection comprising:
an electrical voltage transformer in electrical communication with a source and comprising:
a high-voltage coil comprising a first end and a second end, the first end having a lower voltage than the second end; and
taps disposed proximate the first end of the high-voltage coil;
a multi-level converter coupleable to at least a portion of the taps and configured to independently and simultaneously control series voltage injection and shunt VAR injection to the high-voltage winding, the multi-level converter comprising:
a first leg in electrical communication with a first tap of the taps, wherein the first leg is configured to provide a shunt VAR injection to the first tap;
a second leg in electrical communication with a second tap of the taps;
a third leg in electrical communication with a system neutral and a third tap of the taps, wherein the third leg is connected in series with the third tap and system neutral, and wherein the third leg is configured to provide a series voltage injection to the high-voltage coil; and
a fail-normal switch operably coupled between the third leg of the multi-level converter and the system neutral; and
a controller electrically coupleable to the multi-level converter, such that when the multi-level converter is coupled to the taps, the controller is configured to selectively inject at least one of shunt VARs and series voltage to the high-voltage coil.

15. The transformer system of claim 14, wherein the electrical voltage transformer is a single-phase electrical voltage transformer.

16. The transformer system of claim 14, wherein the first tap is an up-voltage tap, the second tap is a down-voltage tap, and the third tap is a nominal tap.

17. The transformer system of claim 14, wherein the multi-level converter is selected from the group consisting of a two-level power converter, a three-level power converter, and a neutral-point clamped converter.

18. The transformer system of claim 14, wherein a shunt VAR injection range of the controller is dependent on the series voltage injection of the multi-level converter.

19. A method comprising:
coupling a multi-level converter of a transformer system to a high-voltage winding of an electrical voltage transformer of the transformer system;
coupling a controller to the multi-level converter;
independently and simultaneously adjusting series voltage and shunt VARS of the electrical voltage transformer by selectively injecting at least one of shunt VARs and series voltage to the multi-level converter; and
detecting at least one of the series voltage and shunt VARs of the electrical voltage transformer;
wherein the electrical voltage transformer is a single-phase electrical voltage transformer.

20. The method of claim 19, wherein the electrical voltage transformer comprises:
the high-voltage winding comprising a first end and a second end, the first end having a lower voltage than the second end; and
taps disposed proximate the first end of the high-voltage winding.

21. The method of claim 19, wherein a shunt VAR injection range of the multi-level controller is dependent on the series voltage injection of the multi-level converter.

22. The method of claim 19, wherein the controller is external from the transformer system.

23. The method of claim 19, wherein the transformer system is not cooled using transformer oil.

* * * * *